United States Patent

Watanabe

[11] Patent Number: 5,329,469
[45] Date of Patent: Jul. 12, 1994

[54] CALIBRATION METHOD FOR A VISUAL SENSOR

[75] Inventor: Atsushi Watanabe, Minamitsuru, Japan

[73] Assignee: Fanuc Ltd., Yamanashi, Japan

[21] Appl. No.: 820,588

[22] PCT Filed: May 15, 1991

[86] PCT No.: PCT/JP91/00643
§ 371 Date: Jan. 24, 1992
§ 102(e) Date: Jan. 24, 1992

[87] PCT Pub. No.: WO91/19240
PCT Pub. Date: Dec. 12, 1991

[30] Foreign Application Priority Data
May 30, 1990 [JP] Japan ............... 2-140487

[51] Int. Cl.⁵ .................................. G01C 3/00
[52] U.S. Cl. .................. 364/571.01; 364/571.04; 395/89; 395/94; 901/47; 348/95
[58] Field of Search ............ 364/571.01, 571.02, 364/571.04, 571.05, 571.07, 571.08; 901/47; 395/89, 94; 358/107, 93, 101

[56] References Cited
U.S. PATENT DOCUMENTS

| | | | |
|---|---|---|---|
| 4,380,696 | 4/1983 | Masaki | 395/94 |
| 4,753,569 | 6/1988 | Pryor | 901/47 |
| 4,796,200 | 1/1989 | Pryor | 364/513 |
| 4,825,394 | 4/1989 | Beamish et al. | 364/571.01 |
| 4,831,549 | 5/1989 | Red et al. | 395/89 |
| 4,841,762 | 6/1989 | Hunter | 395/89 |
| 4,853,771 | 8/1989 | Witriol et al. | 358/93 |
| 4,907,169 | 3/1990 | Lovoi | 901/47 |
| 4,909,376 | 3/1990 | Herndon et al. | 901/47 |

FOREIGN PATENT DOCUMENTS 0151417 8/1985 European Pat. Off.
0328687 8/1989 European Pat. Off.

OTHER PUBLICATIONS

"Communication Manufacturing Technology," 22nd Annual Meeting & Technical Conference Proceedings of the Association for Integrated Manufacturing Technology, May 14-17, 1985, pp. 256-270.
"Vision Systems for Robot Control," A. Rourke et al., Manufacturing Technology International, No. 1, 1987, London, pp. 185-188.

*Primary Examiner*—Jack B. Harvey
*Assistant Examiner*—Hal D. Wachsman
*Attorney, Agent, or Firm*—Staas & Halsey

[57] ABSTRACT

A visual sensor calibration method of calibrating of a visual sensor in a robot system. A pattern plate is provided on an arm of a robot, and the calibration pattern data (CPDr) of the pattern plate on robot's base coordinates is sent from a robot controller to a visual sensor controller. The visual sensor controller picks up an image of the pattern plate by a camera to obtain calibration pattern data (CPDc). The calibration data (CD) is obtained from the calibration pattern data (CPDr) and the calibration pattern data (CPDc), to thereby calibrate the visual sensor.

7 Claims, 4 Drawing Sheets

CALIBRATION METHOD FOR A VISUAL SENSOR

BACKGROUND OF THE INVENTION

1. Field of the Invention

The present invention relates to a visual sensor calibration method of calibrating a visual sensor in a robot system, and more particularly, to a visual sensor calibration method of calibrating a plurality of cameras or the like.

2. Description of the Related Art

In current practice a robot system is provided with a visual function to enable it to pick up an image of a workpiece by using a camera or the like to determine the position of the workpiece, and thus carry out an operation such as assembling or palletizing or the like. Further, a plurality of cameras are used to accurately determine the position of a workpiece, or to correspond to a plurality of robots.

It is necessary to calibrate the relationship between a a robot coordinate system and a camera coordinate system, to accurately determine the position of a workpiece, and when a plurality of cameras are used, an exclusively designed jig is prepared and used.

Such a calibration jig is large, however, and the jig must be moved by jogging or a similar operation, to thereby pick up images thereof by a camera, resulting in a poor operability.

Further, because most calibration jigs are large, they incur high manufacturing costs and the like, and require a special installation space.

Furthermore, when a plurality of cameras are used, it is difficult to calibrate each camera.

SUMMARY OF THE INVENTION

The present invention is intended to solve the above-mentioned problem, and an object of the present invention is to provide a calibration method for a visual sensor which eliminates the need for moving a jig when implementing a calibration.

Another object of the present invention is to provide a calibration method for a visual sensor by which a visual sensor can be calibrated with a simple calibration jig.

Still another object of the present invention is to provide a calibration method for a visual sensor which permits an easy calibration of each camera.

To fulfill the aforementioned objects, the present invention provides a visual sensor calibration method of calibrating a visual sensor in a robot system, wherein an arm of a robot is provided with a pattern plate for a calibration, the first calibration pattern data of the pattern plate on base coordinates of the robot is sent from a robot controller to a visual sensor controller, the visual sensor controller obtains the second calibration pattern data from the pattern plate, and then acquires calibration data from the first calibration pattern data and the second calibration pattern data, to thereby calibrate a visual sensor.

A robot controller itself holds accurate position data of the pattern plate on the robot coordinate system. More specifically, the robot controller holds the first calibration pattern data of the pattern plate based on a coordinate position of the end of the robot arm and an installation dimension of the pattern plate.

The visual sensor controller reads the first calibration pattern data from the robot controller via a communication line, and further, the visual sensor controller receives an input of an image of the pattern plate from the visual sensor and detects each dot of the pattern to thereby obtain the second calibration pattern data.

The calibration data can be acquired by comparing the first calibration pattern data with the second calibration pattern data.

DETAILED DESCRIPTION OF THE PREFERRED EMBODIMENTS

An embodiment of the present invention is described with reference to the drawings.

Figure 1:
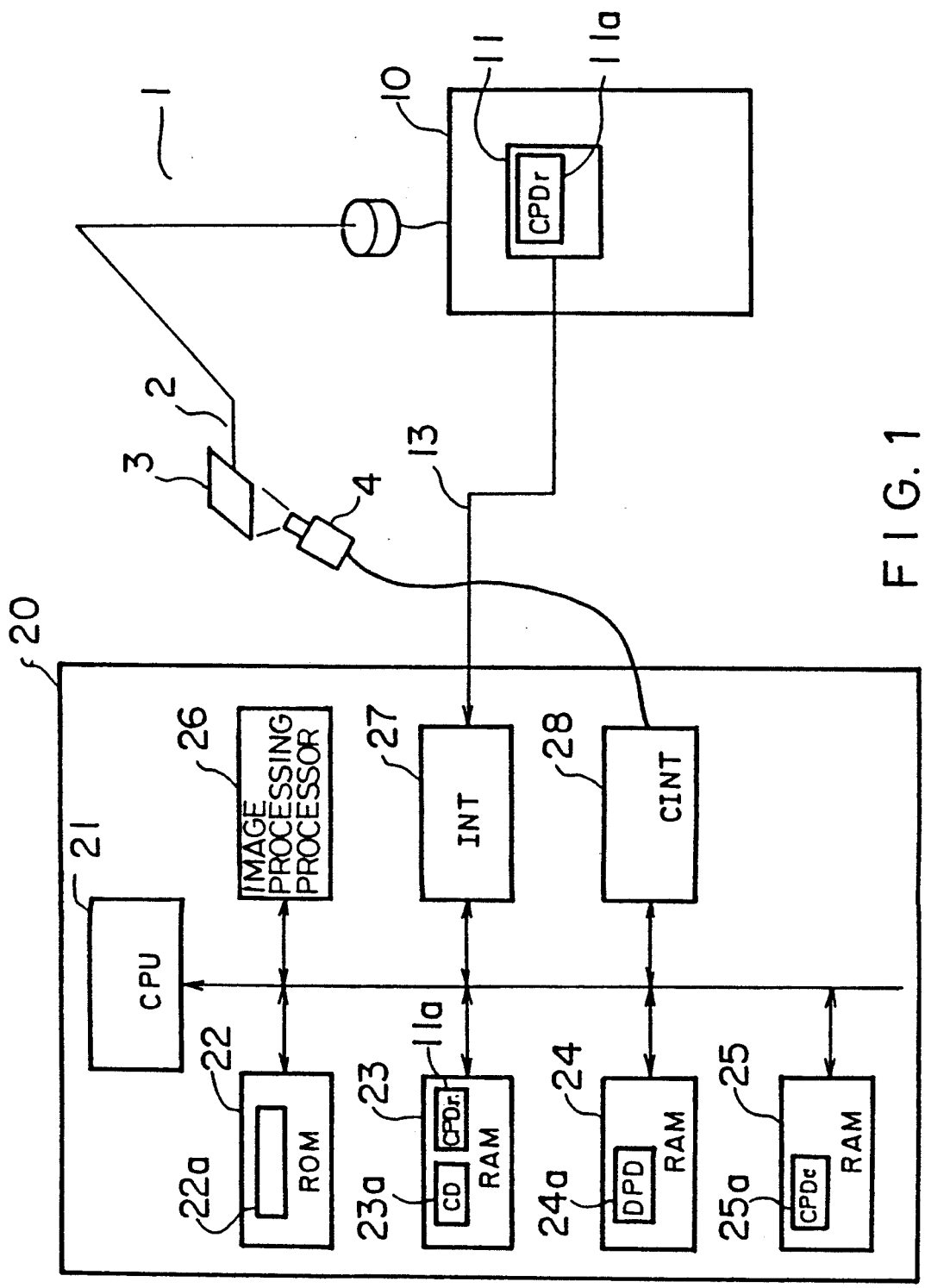
FIG. 1 is a configuration block diagram of a whole robot system for implementing the visual sensor calibration method according to the present invention.

FIG. 1 is a configuration block diagram of an entire robot system for implementing the visual sensor calibration method according to the present invention. In FIG. 1, in order to give a brief description of the flow of the calibration pattern data, only one robot and one camera are used, but in an actual application, a plurality of robots or cameras are used.

A pattern plate 3 provided with a plurality of dot patterns is connected to an arm 2 of a robot 1. The details of the pattern plate 3 will be given later. The robot 1 is controlled by a robot controller 10. The robot controller 10 determines a coordinate position of the end of the arm on the robot's base coordinates, i.e., a coordinate position of TCP (Tool Center Point) as the present position, and accordingly, holds in a memory 11 the calibration pattern data on the robot coordinates which indicates the position of each dot pattern of the pattern plate 3 based on the TCP of the arm 2 and the installation dimension of the pattern plate 3. The calibration pattern data is taken as a CPDr 11a. The robot controller 10 carries out a control such that the pattern plate 3 is not perpendicular to, but is at a certain angle with respect to, the optical axis of a camera 4.

The camera 4 is connected to a visual sensor controller 20 which photographs the pattern plate 3 by using the camera 4, to thereby calibrate the camera 4.

The configuration of the visual sensor controller 20 is centered around a processor (CPU) 21. Control software 22a for implementing the calibration is stored in a ROM 22 to control the calibrating operation, and a RAM 23 stores calibration data (CD) 23a, to be discussed later, and the calibration pattern data (CPDr) 11a received from the robot controller 10. The coordinate position data on each dot of the pattern plate and dot pattern data (DPD), relating to the configuration of the dot pattern, 24a are stored in a RAM 24.

The processor 21 picks up an image of the dot pattern on the pattern plate 3 through the camera 4, in accordance with the control software 22a, and the image data is temporarily stored in a RAM 25 via a camera interface 28. This image data is the video data of each dot pattern on the image surface of the camera 4.

An image processing processor 26 obtains a calibration pattern data (CPDc) 25a of the camera 4 from the position data, i.e., the center position of the pixel of the dots in the image, and the already stored dot pattern data (DPD) 24a, and stores same in the RAM 25.

The calibration pattern data (CPDr) 11a in the robot controller 10 is read from the interface 27 through a communication line 13 and stored in the RAM 23.

Then, the calibration pattern data (CPDr) 11a on the robot coordinates is compared with the calibration pattern data (CPDc) 25a on the camera coordinates, to thereby calculate the position and orientation of the camera coordinate system with respect to the robot coordinate system, and thus perform the calibration. The result is stored in the RAM 23 as the calibration data (CD) 23a.

The calibration data (CD) 23a is used for assembling, palletizing and the like, and this data makes it possible to accurately determine the position and orientation of a workpiece in the robot coordinate system, through the camera 4 and the visual sensor controller.

Figure 2:
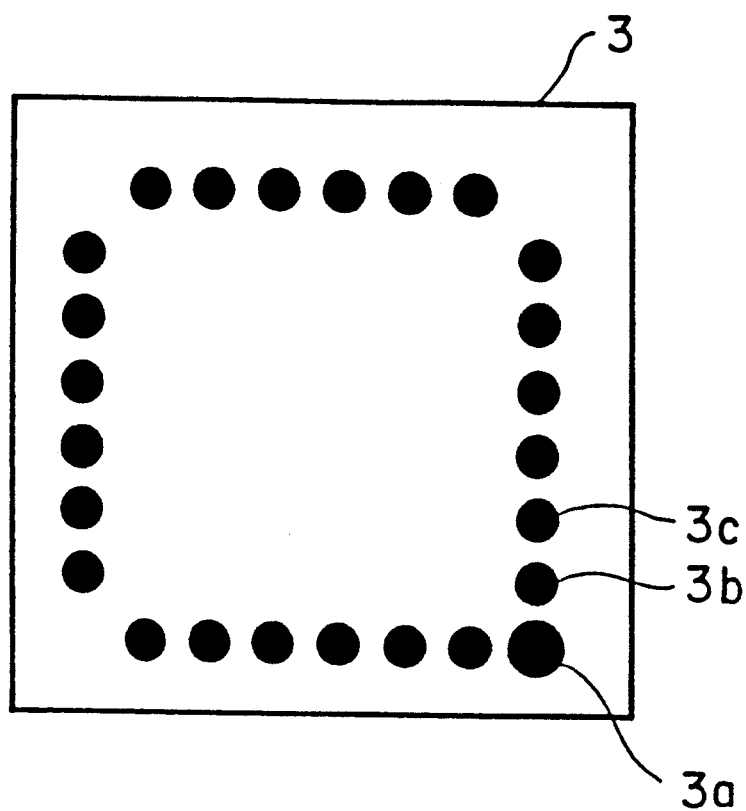
FIG. 2 is a detailed view of dot patterns on the pattern plate.

FIG. 2 is the detailed view of the dot patterns on the pattern plate, corresponding to the DPD, wherein dot patterns 3a, 3b, 3c and the like are arranged in the shape of a square on the pattern plate 3. Theoretically, six dot patterns should suffice, but 25 dot patterns are provided to obtain a more accurate calibration pattern data. The dot pattern 3a, in particular, is made larger than the other dot patterns, to serve as an origin.

Figure 3:
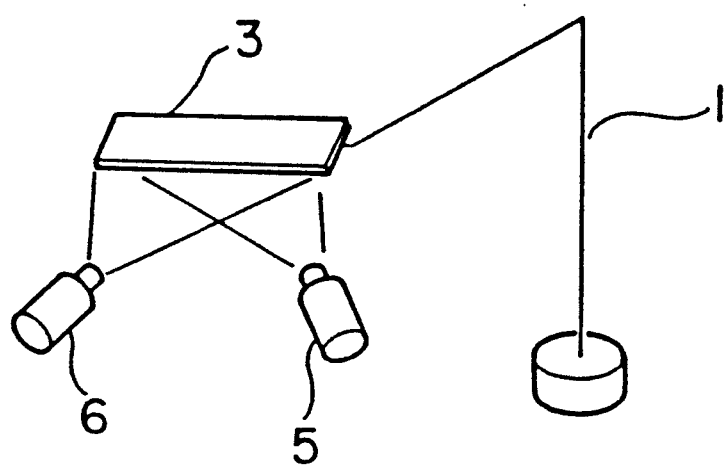
FIG. 3 shows an example of two cameras used to pick up an image of one pattern plate.

FIG. 3 illustrates an example where two cameras are used to pick up an image of one pattern plate. More specifically, by picking up an image of the dot patterns on the pattern plate 3 by two cameras 5 and 6, the calibration of the respective camera coordinate systems can be carried out independently.

Figure 4:
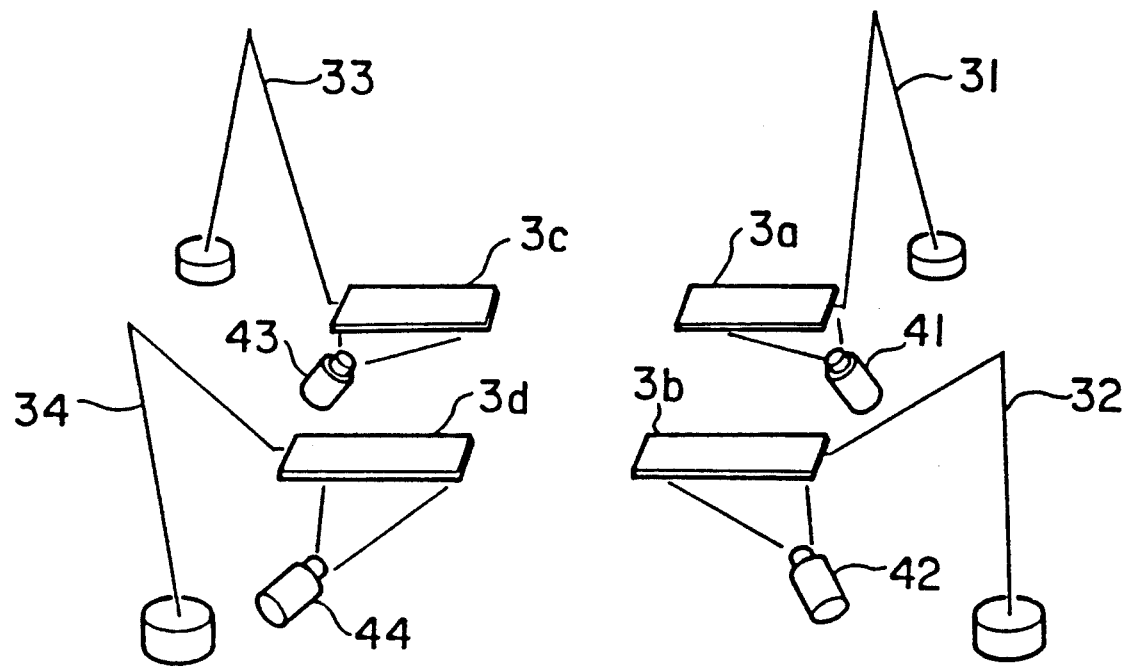
FIG. 4 shows an example whereby, in a robot system comprising four robots and four cameras, all four cameras are calibrated against a robot coordinate system common to all robots.

FIG. 4 illustrates an example where, in a robot system including four robots and four cameras, all four cameras are calibrated with respect to the robot coordinate system common to all the robots. An image of a pattern plate 3a of a robot 31 is picked up by a camera 41, an image of a pattern plate 3b of a robot 32 is picked up by a camera 42, an image of a pattern plate 3c of a robot 33 is picked up by a camera 43, and an image of a pattern plate 3d of a robot 34 is picked up by a camera 44. The picked-up image data of each camera is input to a visual sensor controller, not shown in this drawing, and the calibration data for the respective cameras is calculated. The details of this process are the same as in the case of FIG. 1. As may be also seen from this example, calibration data can be obtained for each camera, and therefore, even when the position or the like of a camera is changed, only the calibration data of that camera need be obtained again.

In the above explanation, an example wherein one robot and two cameras are used and another example wherein four robots and four cameras are used are described, but it is of course understood that those numbers may be changed as necessary.

Also, only one type of pattern plate is required, and as it need not be large, it can be manufactured easily. Further, there is no need to perform a jogging or the like to obtain calibration data.

Although cameras are used as visual sensors in the above description, other equipment such as laser length measuring instruments may be used to read dot patterns on a pattern plate, to thus obtain the calibration pattern data.

As described above, according to the present invention, calibration pattern data in a robot system is sent to a visual sensor controller, which compares that calibration pattern data with the calibration pattern data on the visual sensor coordinates obtained by a visual sensor from the picked-up image data of a camera, to thereby obtain calibration data, and thus the calibration data is easily obtained.

Further, if the visual sensor picks up an image of the pattern plate, this will suffice and no special operation is required. Furthermore, a plurality of visual sensors can be calibrated independently, and in addition, there is no need to use a special jig, thus eliminating the need for a jig installation space.

I claim:

1. A visual sensor calibration method of calibrating a visual sensor in a robot system comprising the steps of:
   providing a pattern plate including a plurality of dots, for obtaining a calibration, on an arm of a robot;
   obtaining, using a robot controller, a first calibration pattern data of said pattern plate at a position of said pattern plate on said robot arm, said first calibration pattern data being coordinate positions of each of said plurality of dots in said pattern plate;
   sending said first calibration pattern data of said pattern plate from said robot controller to a visual sensor controller;
   obtaining, using said visual sensor controller, a second calibration pattern data from an image of said pattern plate, said second calibration pattern data being coordinate positions of each of said plurality of dots in said image of said pattern plate; and
   obtaining, using said visual sensor controller, calibration data from said first calibration pattern data and said second calibration pattern data, to thereby calibrate a visual sensor.

2. The visual sensor calibration method according to claim 1, further including the step of providing a camera to generate said image of said pattern plate for obtaining said second calibration pattern data.

3. The visual sensor calibration method according to claim 1, further including the step of obtaining said second calibration pattern data by a laser length measuring instrument.

4. The visual sensor calibration method according to claim 1, further including the step of obtaining said second calibration pattern data by a plurality of cameras from one pattern plate of said robot, to thereby calibrate each of said plurality of cameras.

5. The visual sensor calibration method according to claim 1, further including the step of obtaining said second calibration pattern data for a plurality of cameras from pattern plates of a plurality of robots, to thereby carry out a calibration.

6. The visual sensor calibration method according to claim 1, further including the step of providing said pattern plate including one dot pattern as an origin and a plurality of dot patterns arranged in a square shape.

7. The visual sensor calibration method according to claim 1, further including the step of providing said calibration data as matrix data.

* * * * *